United States Patent [19]

Moore et al.

[11] 4,005,614
[45] Feb. 1, 1977

[54] MOTION TRANSFER SYSTEM

[75] Inventors: Bruce H. Moore, Kent; Richard D. Houk, Stow, both of Ohio

[73] Assignee: Samuel Moore and Company, Mantua, Ohio

[22] Filed: Nov. 13, 1975

[21] Appl. No.: 631,634

[52] U.S. Cl. ............................. 74/501 R; 74/103; 74/104; 74/504; 74/511 R
[51] Int. Cl.[2] ..................... F16C 1/12; F16C 1/20
[58] Field of Search ............... 74/501 R, 504, 511, 74/480 R, 480 B, 491, 102, 103, 104, 107

[56] References Cited

UNITED STATES PATENTS

| | | | |
|---|---|---|---|
| 2,737,822 | 3/1956 | Morse | 74/480 B X |
| 2,977,816 | 4/1961 | Rice | 74/480 R X |
| 3,101,821 | 8/1963 | Henry | 74/501 R X |
| 3,525,996 | 8/1970 | Moore | 74/501 R |
| 3,704,986 | 12/1972 | Sheesley et al. | 74/104 X |

*Primary Examiner*—Samuel Scott
*Assistant Examiner*—F. D. Shoemaker
*Attorney, Agent, or Firm*—Hamilton, Renner & Kenner

[57] ABSTRACT

A system for transferring motion between locations remote with respect to each other by a push-pull control cable assembly. The system employs a motion conversion unit at either or both control and controlled station, said units serving to convert rotary motion into linear motion, and vice versa. That is, a force transfer shaft is rotatably mounted in the housing of the motion conversion unit to receive, or impart, rotary motion, and the core element of the push-pull control cable assembly — which receives, or imparts, linear motion — extends into, or through, the unit in transversely spaced relation with respect to the shaft. That portion of the normally flexible core element which extends into, or through, the unit is made rigid to impart columnar strength. A crosshead is secured to the rigidified portion of the core element and is slidably received within a first guideway presented from the housing to minimize lateral loading to the rigidified portion of the core element. The crosshead is also slidably received in a second guideway provided on a throw arm secured to the shaft. Movement of the crosshead simultaneously along the two guideways permits a conversion to be effected between the linear movement of the core element and the rotary movement of the force transfer shaft. A universal mounting plate is also disclosed which permits the unit to be mounted in a plurality of dispositions in order to suit the orientation required for various environments.

11 Claims, 10 Drawing Figures

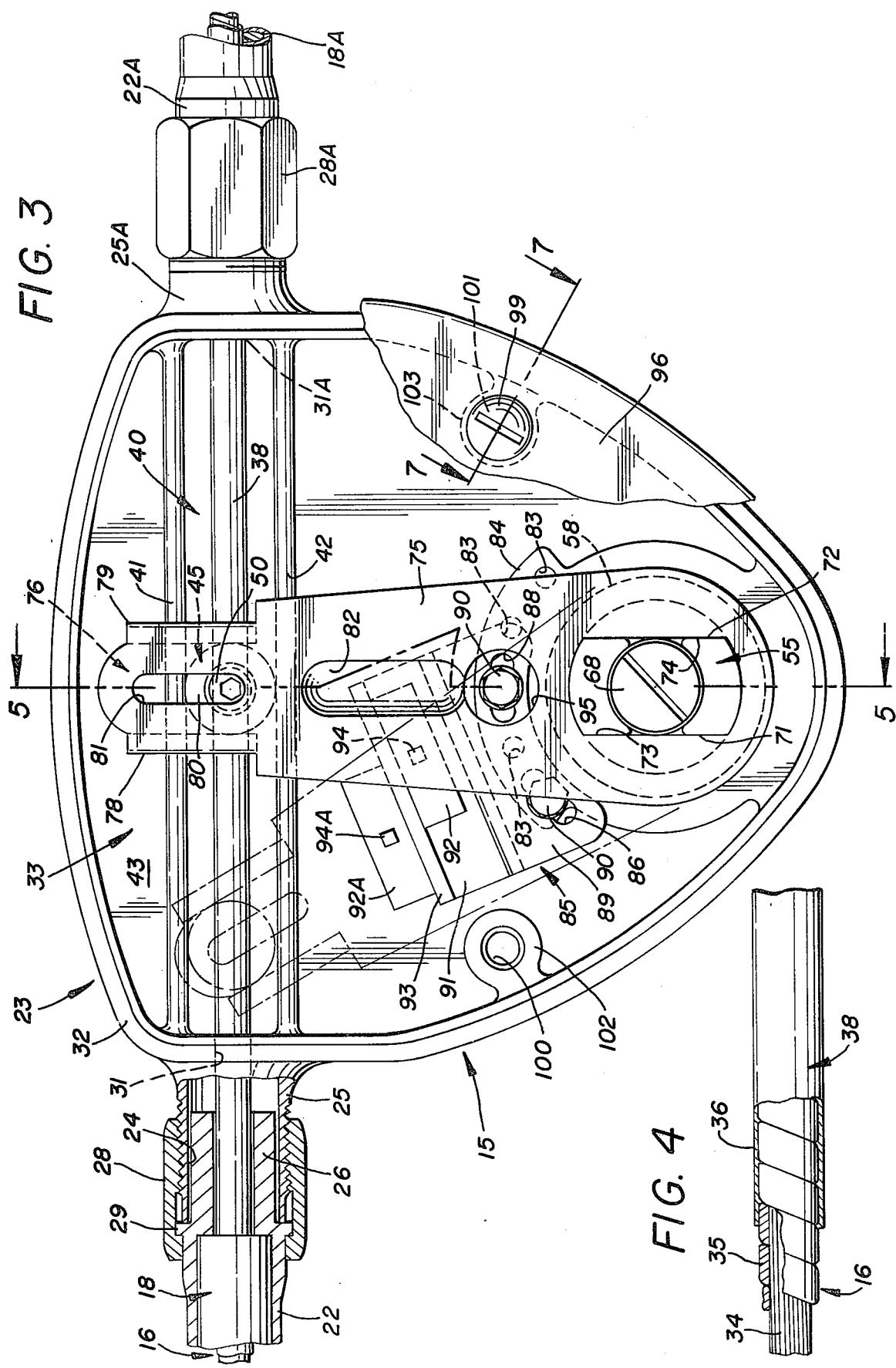

MOTION TRANSFER SYSTEM

BACKGROUND OF THE INVENTION

The present invention relates generally to push-pull cable assemblies used to transmit mechanical motion between remote control and controlled stations. More particularly, the present invention relates to an improved concept by which the core of a push-pull control cable assembly interacts with a novel force conversion unit at the control and controlled stations to comprise an improved concept for the transmission of mechanical motion therebetween. Specifically, the present invention relates to an improved concept by which to convert selective rotary motion to linear reciprocation of the core in a push-pull control cable assembly for transmitting mechanical motion to one or more remote locations where the reciprocating motion is reconverted to rotary motion.

The most basic form of motion transfer between locations remote from one another has for years conventionally utilized rope (or cable) and pulleys, or other "balanced" remote control systems. Balanced remote control systems are almost as old as recorded history, and, when used in conjunction with steering mechanisms such as found on old sailing ships, have traditionally comprised a wheel and shaft with a rope drum to provide the required movement of the rope necessary to operate the rudder or other controllably driven components. The appellation "balanced" appears quite appropriate when it is realized that the mechanical motion transmitting ropes, or cables, form a closed system because of their inability to relay mechanical motion by other than tensile stresses.

Balanced systems are still widely used in a host of environments quite diverse from marine steering systems. However, balanced systems are quite bulky and cumbersome. Moreover misalignment between the guiding pulleys, rope drums or any of the other components can cause excessive binding and wear to the system.

The advent of push-pull control cable assemblies provided, in a single cable, the necessary structure for effecting remote control by the application of either tensile or compressive forces. The push-pull control cable assembly thus provides a transfer device which overcomes the difficulties incident to balanced systems and is particularly easy to install without requiring specialized engineering or mechanical ability.

Push-pull control cable assemblies, generally, are well known to the art as devices capable of transmitting mechanical motion in either direction when at least the ends of the cable casing are satisfactorily clamped in position. Although the prior art knows many constructions for push-pull control cable assemblies, an exemplary form employs a casing constructed with a plurality of wires laid contiguously in a long pitched helix around the outer periphery of a flexible, plastic tube. The helically arranged wires of the casing are maintained in their proper position solely by a plastic cover in smaller cables and by a reinforcing spread helix of wire, or flat metallic ribbon, in conjunction with a plastic cover, in larger cables. This construction provides a casing with the required flexibility and permits reciprocation of the cable core therein with the maximum efficiency.

The plastic tube which comprises the innermost element of the cable casing not only acts as a bearing for the core of the cable assembly which is slidable within the casing, but also acts to protect the casing wires from any natural elements gaining access to the passageway through the interior of the cable casing.

The plastic cover which comprises the outermost element of the cable casing not only acts as a structural member to retain the casing wires in their helically coiled configuration but also acts as a protective member to shelter the wires from the natural elements having access to the exterior of the casing.

Actuation of the core element in a push-pull control cable assembly, however, requires something more than the prior rope drum of the balanced system, and complex actuating heads have been developed to translate rotative motion into the linear motion of the push-pull control cable core element.

Fittings are provided at each end of the cable casing to provide a means for securing the control cable in operative position and to seal, as well as possible, the ends of the wires from the elements.

At least two major types of approach have been employed to effect a mechanical connection between the core element of the push-pull control cable assembly and the control mechanism by which linear motion is converted into rotary motion, and vice versa.

One approach has been to connect the core element to a push rod that is telescopically slidable within a sleeve that is connected to the casing of the push-pull control cable assembly. In this configuration the sleeve offers some support to the core element as it extends beyond the casing, and the push rod possesses the necessary columnar rigidity to transmit both tensile and compressive loads exteriorly of both the cable casing and the terminal sleeve. This arrangement is widely employed, works quite well and, because it possesses only two disadvantages, is largely accepted. The two major drawbacks are the space required operatively to mount a push rod and sleeve — both of which must be sufficiently longer than the required throw to be effected by the push rod in order for the push rod to remain directionally supported by the sleeve even when the push rod has been extended outwardly of the sleeve to its maximum extent — and the inability of the sleeve completely to support the core element against "snaking." In this latter regard it must be appreciated that in order effectively to secure the core element to the push rod at least a portion of the push rod slidably received within the sleeve is normally of a diameter greater than the diameter of the core element. As such, the core element is not fully supported within the sleeve and the core element will snake under compressive loading. This snaking reduces the tactile sensitivity of the control mechanism and induces backlash.

A second approach has been to provide a control mechanism within which the core element would be more fully supported. This approach is exemplified by a construction in which the core element is attached to the outer periphery of a drum-like, internally toothed gear plate. The drawback to this arrangement lies in the fact that, as the gear plate is rotated to apply compressive stresses to the core element, it tends to move radially away from the gear plate. Various backings have been tried to restrain the core element against this radially outward movement, but all have some deficiencies which make them unsatisfactory for heavy loading and maximum rotation. One backing comprises a fixed plastic ring encircling the periphery of the gear plate which confines the core element against moving radially outwardly, but this arrangement has been found to impart excessively high frictional resistance against movement of the core element by the application of compressive forces.

Another backing devised in an attempt to obviate the difficulties attendant upon applying compressive forces by the gear plate type of rotary actuator utilizes a plurality of rotatably mounted rollers circumferentially spaced about the gear plate and engagable by the core element as it moves radially under the application of compressive forces induced by the rotation of the gear plate. With this type actuator the core element tends to flex severely between its points of contact with the rollers causing backlash, and this, together with the friction attendant upon the spindle mounting of the rollers, deprives such constructions of the desired efficiency.

SUMMARY OF THE INVENTION

It is a primary object of the present invention to provide a motion transfer system which does not employ the traditional push rod and sleeve mechanism at the end of the push-pull control cable assembly and which is, therefore, extremely compact.

It is also an object of the present invention to provide a motion transfer system, as above, which does not wind the core element of the push-pull control cable assembly onto the periphery of a drum-like member and which thereby eliminates considerable frictional resistance against movement of the core element under those operating conditions when it would attempt to expand radially outwardly against a backing member.

It is another object of the present invention to provide a motion transfer system, as above, in which a novel motion conversion unit is located at either or both control and controlled station, said units being adapted for connection either to the ends of the core element in the push-pull control cable assembly or to any selected location medially the ends of said core element.

It is yet another object of the present invention to provide a motion transfer system, as above, in which the flexible core element is supported throughout its entire length, thus eliminating backlash (or "snaking") and affording the greatest possible tactile sensitivity to the operator at the control station.

It is still another object of the present invention to provide a motion transfer system, as above, in which that portion of the core element which extends within the force conversion unit at each control and controlled station has a unique configuration to impart columnar rigidity thereto.

It is a further object of the present invention to provide a motion transfer system, as above, in which a novel interconnection is effected between the core element and the motion conversion unit by which rotary motion is converted into linear motion, and vice versa.

It is a still further object of the present invention to provide a motion transfer system, as above, to provide a means for readily mounting the motion conversion unit in a plurality of dispositions in order to accommodate various environmental considerations, including the desired cable orientation.

It is yet a further object of the present invention to provide a motion transfer system, as above, in which the motion conversion unit employed thereby: can itself be completely sealed; can be completely sealed to the push-pull control cable casings to which it is operatively connected; and, even with the foregoing objects satisfied, is relatively uncomplex and economical to manufacture and maintain.

These and other objects which will become apparent from the following specification are accomplished by means hereinafter described and claimed.

In general, a motion transfer system embodying the concept of the present invention employs a motion conversion unit at each control and controlled station — there may be multiple control and/or controlled stations.

A push-pull control cable assembly interconnects the control and controlled stations in series. That is, the core element of the push-pull control cable assembly extends continuously between all stations in the system — the core element being slidably received within lengths of push-pull cable casing which extend between, and are connected to, the sequentially disposed control units.

Each motion conversion unit comprises a housing in which a force transfer shaft is rotatably mounted. At a control station the shaft is secured to a control means, such as a lever, and at a controlled station the transfer shaft is operatively connected to the device to be remotely operated.

A metallic sleeve is secured about that portion of the core element which extends into, or through, each conversion unit in order to rigidify that portion of the core element and impart substantial columnar rigidity thereto. When so secured the outer diameter of the sleeve should be substantially the same diameter as the core element in order to permit facile sliding of the rigidified portion of the core into and out of the cable casing. One method by which this dimensional relationship can be achieved is by rotary swaging the sleeve onto the core. A crosshead is secured at a selected location along the rigidified portion of the core element and is slidably received within a first guideway which parallels the linear path of the rigidified core element which extends into, or through, the conversion unit.

A throw arm is secured to the transfer shaft and presents a second guideway in which the crosshead is also slidably received. Movement of the cross head simultaneously along the two guideways effects a conversion between the rotary motion of the transfer shaft and the linear movement of the core element, and vice versa.

Switch means can be selectively positioned within the conversion unit for actuation by the throw arm as it swings to, or through, a predetermined position.

A universal mounting plate is also provided which permits installation of the motion conversion unit to suit the orientation requirements for a wide variety of installations.

DESCRIPTION OF THE DRAWINGS

FIG. 3 is an enlarged elevation, partly broken away, of a motion conversion unit employed by the subject motion transfer system, the internal mechanism being depicted in solid line at the mid-range of its movement and in phantom at one extremity of its range of movement;

FIG. 4 is an enlarged, elevation, partly broken away, depicting the configuration of a push-pull control cable core element adapted to withstand tensile and compressive loading (i.e., rigidified) even though unsupported by the push-pull cable casing, as such a core element would be when operatively connected to the mechanism of a motion conversion unit such as depicted in FIG. 3;

DESCRIPTION OF THE PREFERRED EMBODIMENT

Figure 1:
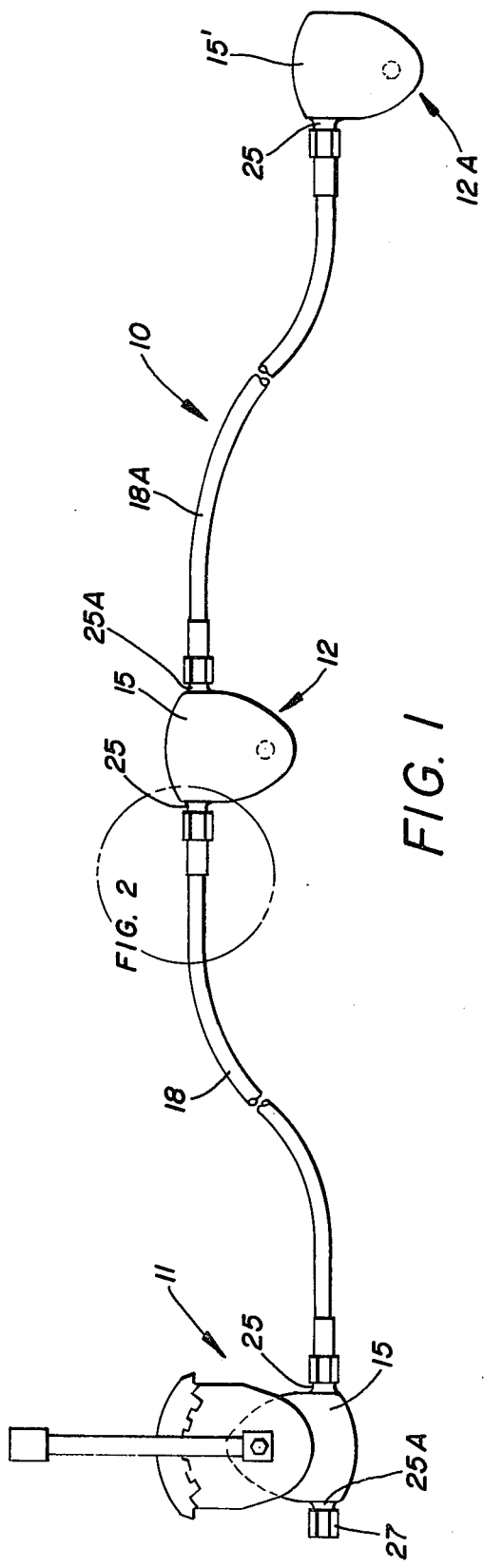
FIG. 1 is a schematic elevation of a motion transfer system embodying the concept of the present invention and being depicted in an environment wherein a single control station actuates multiple, controlled stations remote from the control station.

A motion transfer arrangement embodying the concept of the present invention employs a push-pull control cable assembly, identified generally by the numeral 10 in FIG. 1, which extends between the control and controlled stations. Although there may also be a plurality of control stations, in the embodiment depicted the push-pull cable assembly 10 extends between a single control station 11 and one or more controlled stations 12 and 12A, both remote with respect to the control station 11.

A unique motion conversion unit 15 provided by the subject invention for converting between rotary and linear motion is as readily applicable to the control as the controlled station, as will hereinafter become readily apparent.

Figure 2:
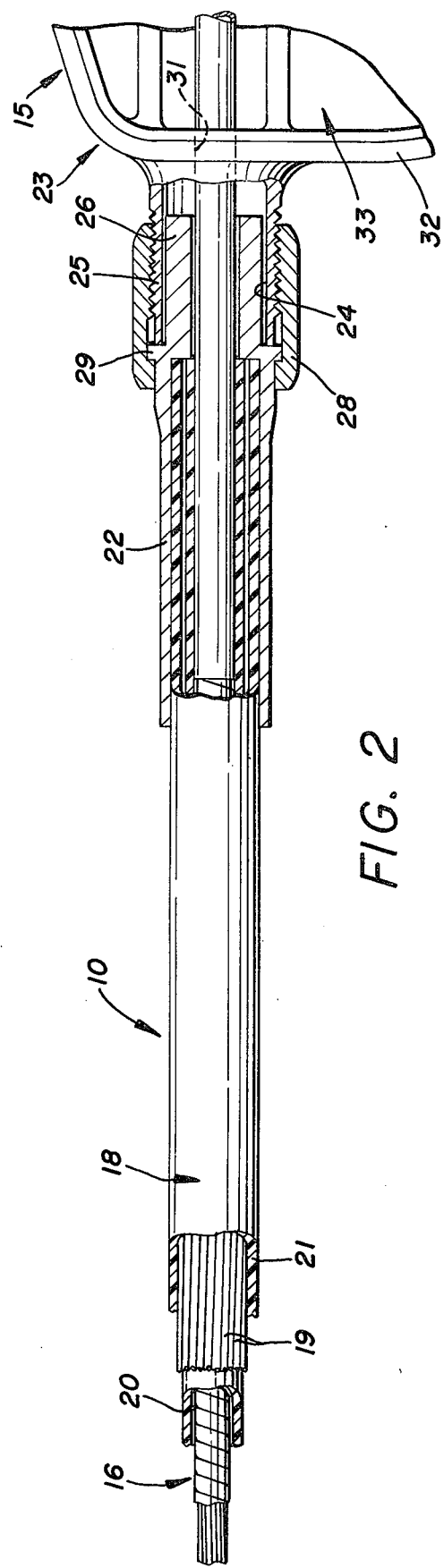
FIG. 2 is substantially that area of FIG. 1 designated by the chain line circle which has been considerably enlarged and partially broken away.

As best seen in FIG. 2, the push-pull control cable assembly 10 includes a core element 16 and a casing 18 in which the core element 16 is reciprocably slidable. The prior art is replete with numerous casing constructions, an exemplary form of which is depicted herein and comprises a plurality of wires 19 contiguously laid in the form of a relatively long pitched helical coil about the radially outer surface of an inner, flexible tube 20 which extends the full length of the casing 18. An outer, flexible cover 21 encases the coil of wires 19 and extends along the entire casing to within at least a short distance from the ends of the wires 19. A fitting 22 is received over the end of the casing 18 and is securely attached thereto, as by swaging. The fitting 22 is, in turn, secured to the housing 23 of the motion conversion unit 15.

As best seen in FIGS. 2 and 3, a socket 24 is provided in a cylindrical anchor stub 25 which extends outwardly from the housing 23. A pilot extension 26 on the end fitting 22 is removably secured within the socket 24 and selectively held therein by a clamping means, which may be in the form of a union nut 28 that engages a peripheral flange 29 on the end fitting 22 and which is threadably secured to the exterior of the anchor stub 25. The core element 16, which is reciprocably slidable within the casing 18, extends axially outwardly of the end fitting 22, through an aperture 31 in the peripheral wall 32 of the housing 23 and across the interior cavity 33 thereof.

Figure 9:
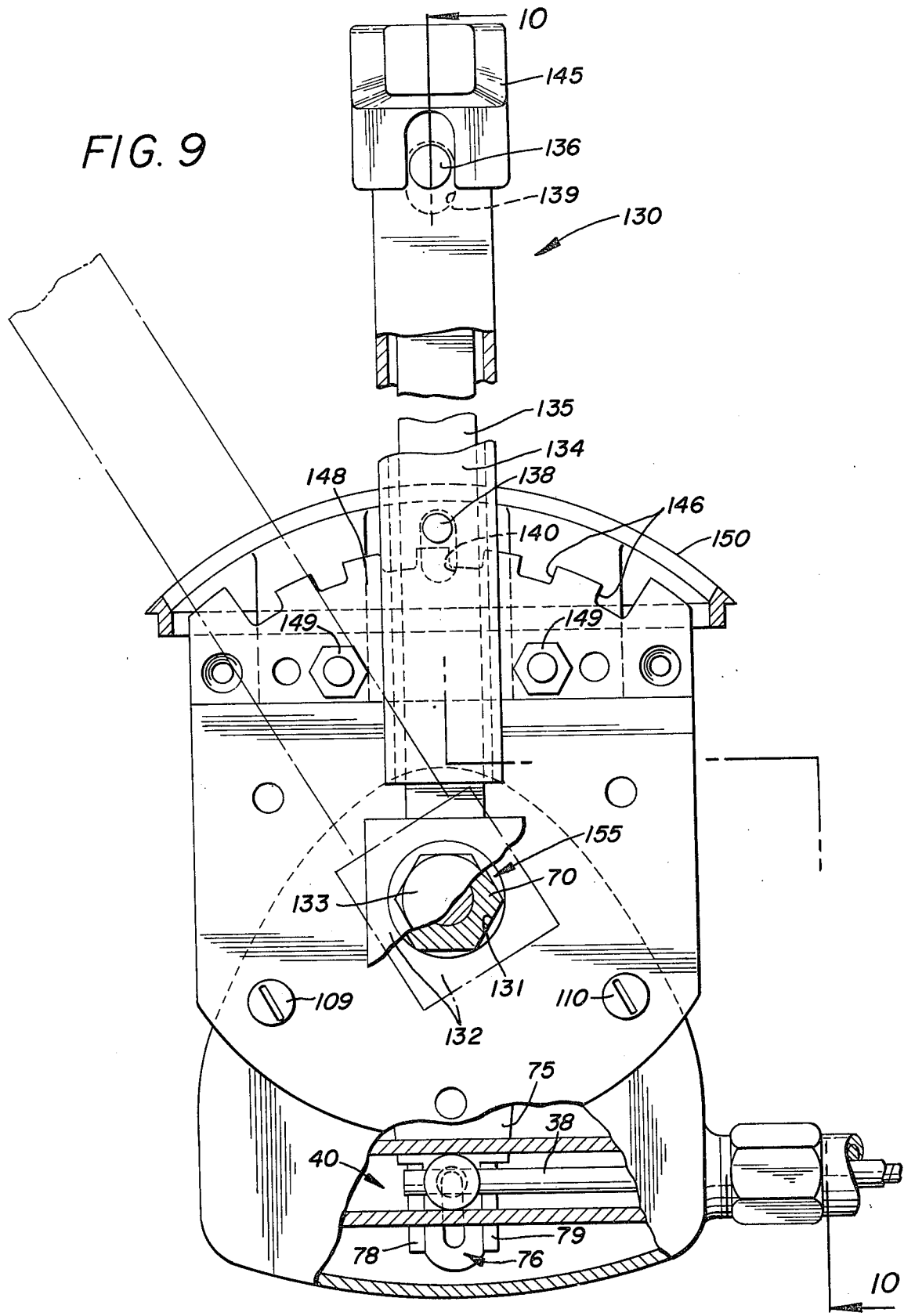
FIG. 9 is an elevation depicting a control lever operatively connected to the motion conversion unit, as it would be at a controlled station, the control lever being depicted in solid line at mid-range of its movement and in phantom at one extremity of its range of movement; and, FIG. 10 is a partial vertical section and partial end elevation taken substantially along line 10—10 of FIG. 9.

For a terminal station 11 or 12A the core 16 may terminate within the cavity 33 (as best seen in FIG. 9), but for an intermediate station such as exemplified at 12, and as is represented in greater detail in FIG. 3, the core 16 will extend across the cavity 33 and out through an opposing aperture 31A in peripheral wall 32 and into a second section of cable casing 18A, the fitting 22A of which is secured to a corresponding anchor stub 25A by a union nut 28A. As shown in FIG. 1, the unit 15 at stations 11 and 12 are each provided with opposed anchor stubs 25 and 25A, and if only one anchor stub is required, the unused stub can be capped, as at 27. However, the motion conversion unit may be provided with only one anchor stub, as represented by unit 15' at station 12A.

In either event, that portion of the core element 16 which extends into, or through, the housing cavity 33 is specially prepared to obviate the necessity of employing a push rod and thereby eliminates the attendant disadvantages previously enumerated herein. Specifically, the normally flexible core element is made substantially rigid by affixing a sleeve over that length of the cable which will enter into the cavity 33 and by rotary swaging it onto the core 16. In order to achieve the desired results a delicate balance must be achieved between the relative sizes of the core, sleeve and cable casing — the desired result being that when the sleeve is swaged onto the core the columnar strength of the combination must be sufficient to receive and transmit compressive loads without lateral support and yet there must not be a significant difference between the outer diameter of the combined core and sleeve and the outer diameter of the core itself in order to permit freely slidable reciprocation of the reinforced portion of the core within that portion of the casing in immediate proximity to the motion conversion unit 15.

As an example, let us consider a typical core element 16 denominated as having a nominal 0.142 inch diameter. This core element is comprised of a 1 × 19 base wire rope 34 (FIG. 4) having an outer diameter of 0.109 inches. Flat wire strand material 35 having a width of 0.090 inches and a thickness of 0.020 inches is helically wrapped about the outer periphery of the wire rope 34 (making a composite nominal outer diameter of 0.149 inches). This assembly is swaged to an outer diameter of 0.141 inches and comprises the configuration of the core element 16 that communicates between stations 11, 12 and 12A. This core element 16 is slidably received within the casing 18, the inner diameter of which is 0.156/0.160 inches. The aforesaid core element 16 — when slidably received within, and laterally supported by, the casing 18 — is eminently suitable for transmitting loads by the application of forces resulting in either tensile or compressive stresses and yet is sufficiently laterally resilient to negotiate relatively arduous bends in the disposition of the casing 18 and 18A between stations 11, 12 and 12A without assuming a "set" that would deter further reciprocation.

In order specially to prepare the core element 16 for accepting the stresses to which it must be subjected within the unit 15, and for which its normal resilience is ill-suited without the lateral support of the casing, it has been found sufficient to secure a sleeve 36 to that entire span of the core 16 which will, during operation of the unit 15, enter the cavity 33 and thereby lose the lateral support provided by the casing 18. Continuing with the example of the 0.141 inch core 16, the sleeve 36 may comprise a metallic tube having an internal diameter of 0.169 inches and an outer diameter of 0.189 inches. Such a sleeve 36 is positioned over an appropriate length of the core 16 and is then swaged to an outer diameter of 0.145 inches. This unique configuration presented by the length of core 16 over which the sleeve 36 is swaged results in a relatively rigid portion 38 of the core element 16 that is particularly suited to the novel motion conversion unit 15, the further constructional details of which will now be described.

Referring again to FIG. 3, a guideway 40 is delineated by parallel, laterally spaced rails 41 and 42 presented from the base wall 43 of the housing 23, the guideway 40 extending across the cavity 33 in alignment with the orientation of the rigid portion 38 of the core element 16. A crosshead 45 is selectively positionable along the rigid portion 38 of the core 16 and is confined to slide along the guideway 40 by virtue of the rails 41 and 42.

Figure 5:
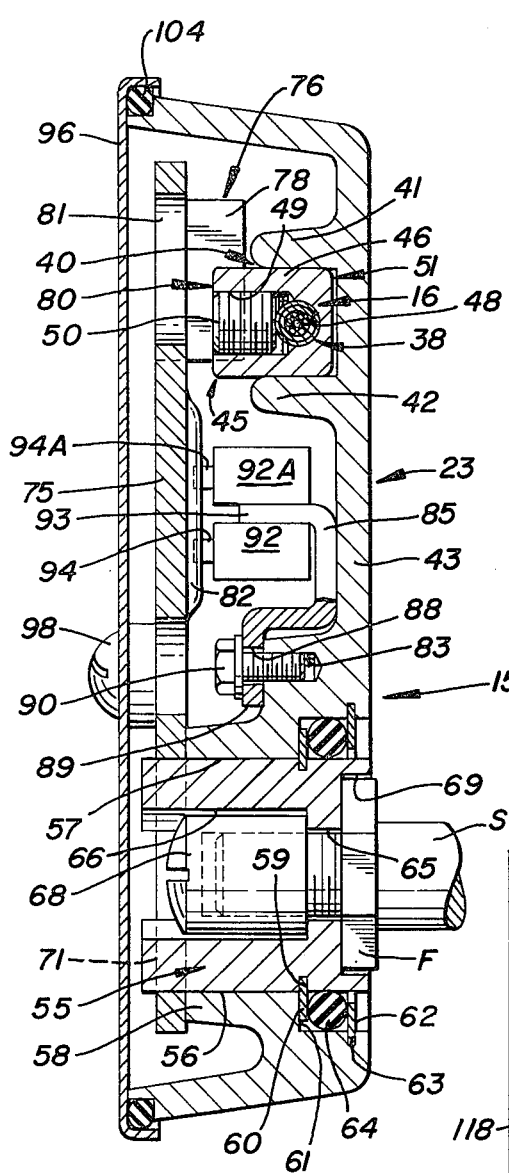
FIG. 5 is a vertical section taken substantially along line 5—5 of FIG. 3, the motion conversion unit depicted therein employing one embodiment of a force transfer shaft.

As best seen in FIG. 5, the crosshead 45 comprises a cylindrical body 46 with a crossbore 48 — through which the rigid portion 38 of the core element 16 is received — and a threaded, axial bore 49 which intersects the crossbore 48 and within which a set screw 50 can be adjusted to clamp the crosshead 45 onto any desired location along the rigid portion 38. One end portion 51 on the cylindrical body 46 of the crosshead 45 is confined between the rails 41 and 42 and is slidable along the guideway 40.

A force transfer shaft 55 is rotatably mounted through the base wall 43 of housing 23 in transversely spaced relation with respect to the guideway 40. In order for the force conversion unit 15 to be readily adaptable for either the control station 11 or the controlled stations 12 and 12A, and in order to permit adaptability of the stations to a wide assortment of environments, it has been found highly desirable for the force transfer shaft 55 to comprise an adaptive module. As best seen in FIG. 5, the transfer shaft 55 presents a cylindrical outer surface 56 that is rotatably mounted through a bore 57 within a boss 58 presented from the base wall 43 of the housing 23. An annular groove 59 in the outer surface 56 receives a first retaining ring 60 which engages a shoulder 61 in the housing 23. A second retaining ring 62 is received within a groove 63 provided in the housing 23, and the two retaining rings 60 and 62 are spaced axially apart to compress an annular seal 64 therebetween.

Figure 6:
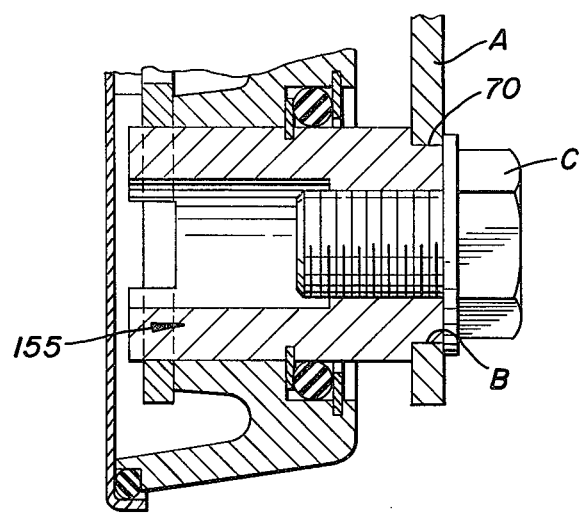
FIG. 6 corresponds to a portion of FIG. 5 and depicts an alternative embodiment of a force transfer shaft.

A connector bore 65, which may or may not be required to be tapped, extends axially through at least a portion of the force transfer shaft 55, and a counterbore 66 is provided at the axially inner most end of the connector bore 65 to receive a fastening means, such as cap nut 68 by which to maintain the operative connection with a shaft S to be selectively rotated at a controlled station. The axially outermost end of the connector bore 65 is associated with a drive surface, such as either the recessed polygon (normally a hexagon) 69 depicted in FIG. 5, or the external polygon 70 as depicted in conjunction with the alternative form of the transfer shaft 155 shown in FIG. 6. In the FIG. 5 embodiment the shaft S may be provided with a radially directed, polygonal (such as a hexagon) flange F which matingly engages the recessed polygon 69. In the alternative construction depicted in FIG. 6, an arm A may be provided with a polygonal bore B that is matingly received over the external polygon 70 and retained thereon by a cap screw C.

The axially innermost end of the force transfer shaft 55 presents opposed flats 71 and 72 (FIG. 3) to effect a driving connection with corresponding flats 73 and 74, respectively, on a throw arm 75 that may be a press fit onto the shaft 55 to rotate therewith. As best seen in FIGS. 3, 5 and 9, the radially outer end of the throw arm 75 is provided with a guideway 76 formed from a pair of opposed flanges 78 and 79. The second end portion 80 on the cylindrical body 46 of the crosshead 45 is slidable along the guideway 76.

A first slot 81 penetrates the throw arm 75 to provide access to the guideway 76. By this construction one has access to the set screw 50 so that the position of the cross head 45 along the rigid portion 38 of the core 16 can be adjusted without dismantling the entire unit 15.

Movement of the crosshead 45 simultaneously along the guideways 40 and 76 effects a continuous, operative interconnection between the core element 16 and the throw arm 75 and accommodates the arcuate movement of the throw arm 75 through the full sector of its rotation to the purely linear movement of the rigid portion 38 of core element 16 as they move within the cavity 33 in housing 23.

The medial portion of the throw arm 75 is preferably provided with a lug 82 in the form of a ridge which can serve to actuate various switch means as the throw arm 75 swings to predetermined positions — it being appreciated that failsafe and other electromechanical devices are often highly desirable adjuncts to control units. In order selectively to position one or more switch means with respect to the throw arm 75 a bracket is selectively positioned within the housing.

For example, a plurality of tapped bores 83 may be located at circumferentially spaced locations along a shoulder 84 that is stepped down from, and extends about, the periphery of the boss 58, and a switch bracket 85 may be selectively mounted from the shoulder 84. In the embodiment of the unit 15 depicted, five bores 83 are spaced at 22¼° intervals. With this disposition of the bores 83, a pair of arcuate slots 86 and 88, each of which have a span of 15°, and which are spaced 30 degrees apart on the mounting tab 89 of the switch bracket 85, permit the bracket to be located at any desired position within the range of throw arm 75 and be so secured by a pair of cap screws 90 tightened through the arcuate slots 86 and 88 into the appropriate bores 83.

Supported by the mounting tab 89 is a channel 91 within which a push-button switch 92 may be secured. The outermost flange 93 of the channel 91 may be suitably bored for fastening the switch 92 within the channel or for supporting a switch 92A exteriorly of the channel itself, as shown.

With the switches 92 and/or 92A mounted on the bracket 85 and the bracket 85 selectively positioned within the housing 23, rotation of the throw arm 75 will cause the lug 82 to depress the push-button 94 and/or 94A on the respective switches 92 and 92A when the throw arm reaches a predetermined position in order to effect the desired result.

It should be noted that the throw arm 75 has a second aperture 95 which permits access to the cap screws 90 and thus allows adjustment to the position of the switch bracket 85 (and thus the switches 92 and/or 92A) without dismantling the unit 15.

A cover plate 96 may be detachably secured to the housing 23 by a pair of cap screws 98 and 99. The cap screws 98 and 99 are received in tapped bores 100 and 101 provided in a pair of circumferentially spaced bosses 102 and 103 along the peripheral wall 32 of the housing 23. A sealing ring 104 is preferably provided between the cover plate 96 and the peripheral wall 32, as shown in FIG. 5.

Figure 8:
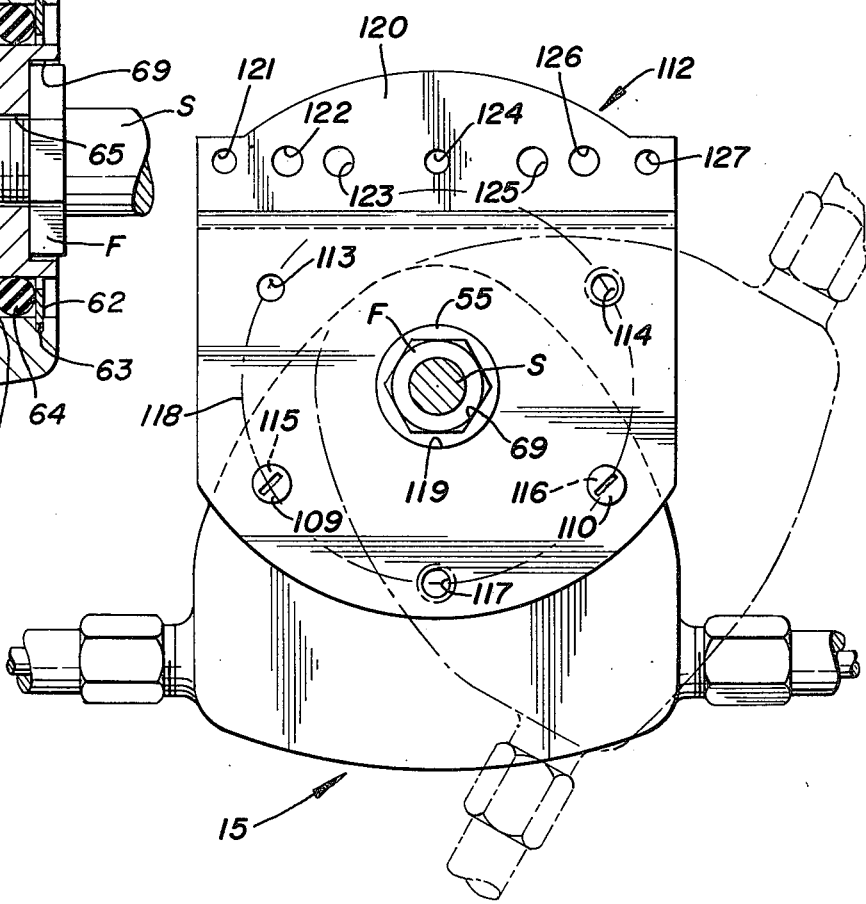
FIG. 8 is an elevation depicting a mounting plate by which selectively to position the motion conversion unit, one position being depicted in solid line and a second, exemplary position, being depicted in chain line.
Figure 7:
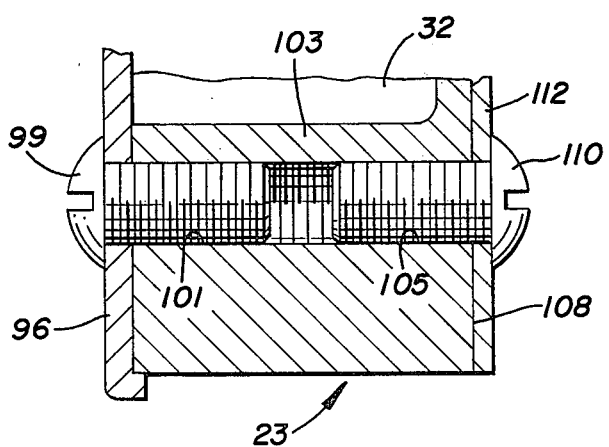
FIG. 7 is an enlarged cross section taken substantially on line 7—7 of FIG. 3 and appearing on the same sheet of drawings as FIG. 10.

As exemplified by the boss 103 depicted in FIG. 7, each boss 102 and 103 is provided with an opposed, tapped bore 105 opening on the obverse side 108 of the control unit 15 — i.e., that side of the unit from which an external device is operatively connected to the force transfer shaft 55 — and preferably symmetrically with respect to said shaft 55. A pair of cap screws 109 and 110 are receivable in the respective bores 105 to secure a universal mounting plate 112, as best shown in FIG. 8.

The universal mounting plate 112 is highly recommended for installing the unit 15 to suit the orientation requirements for a wide variety of installations. The mounting plate 112 is provided with five bores 113, 114, 115, 116 and 117 which are spaced to permit four variations in the disposition of the unit 15 with respect to the plate 112. That is, the bores 113–117 are positioned such that the span between bores 105 in the housing 23 is equaled by each of four spans between bores 113 and 114; 115 and 116; 113 and 117; and, 114 and 117. The bores 113–117 are located on a bore ring 118 located concentrically about an enlarged aperture 119 through which a driving connection with the force transfer shaft 55 can be effected.

An offset portion 120 of the mounting plate 112 is provided with a plurality of bores 121–127, one or more of which can be employed fixedly to mount the plate 112, and thereby the unit 15, in the desired location for the unit 15 to serve as a controlled station 12 or 12A.

On the other hand, because the unit 15 is as equally suited for converting rotary motion to linear motion as for converting linear motion to rotary motion, the unit 15 is also readily adapted to serve as the control station 11. In this situation a control lever 130 (FIGS. 9 and 10) with a polygonal opening 131 through the hub 132 thereof is received on the polygonal end portion 70 of the force transfer shaft 155 and is secured thereon by a cap screw 133.

A hollow, detent actuation tube 134 is slidably received over the shaft portion 135 of the control lever 130. First and second pins 136 and 138 are anchored in, and extend transversely of, the actuation tube 134, each of which extend through corresponding openings 139 and 140 provided in, and oriented axially with respect to, the shaft portion 135 of the control lever 130, thereby affording a free range of movement for the actuation tube 134 with respect to the shaft portion 135.

The first pin 136 is located in proximity to the radially outer end of the shaft portion 135 so that it can be conveniently grasped by the fingers of a person having their hand on the control knob 145 mounted on the radially outer end of the shaft portion 135.

The second pin 138 extends laterally of the actuation tube 134 for engagement with the detent notches 146 on a quadrant plate, or coxcomb, 148 secured, as by nut and bolt combinations 149 to the offset portion 120 of the mounting plate 112. Manipulation of the first pin 136 effects the desired engagement or release of the second pin 138 from the detent notches 146.

Figure 10:
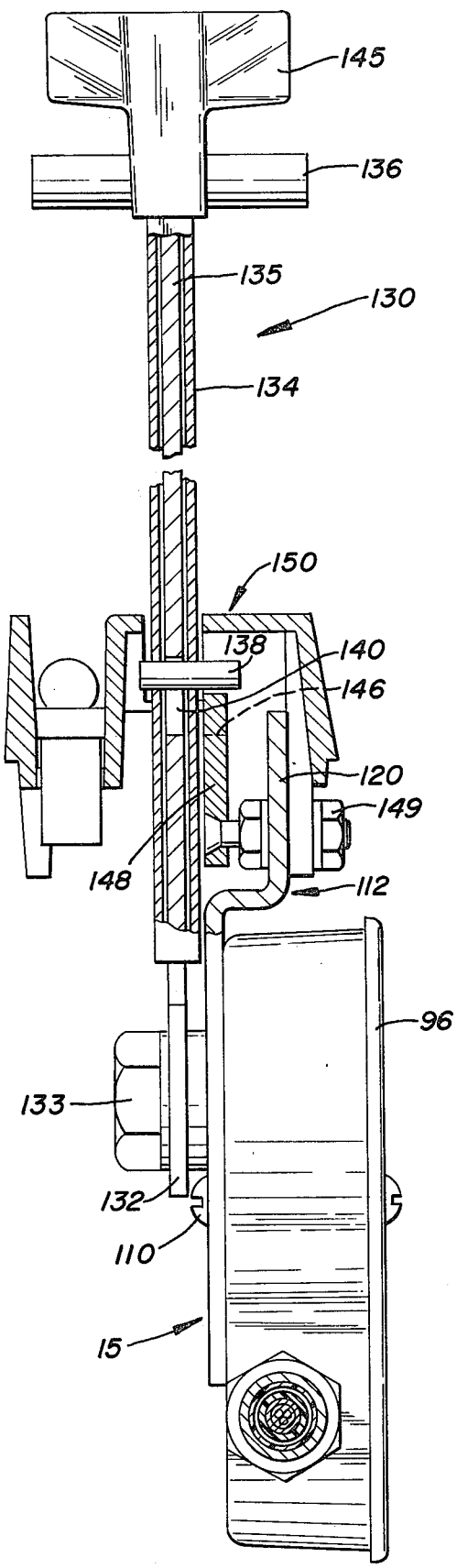

The control arm 130 may extend through a control head 150 that is also mounted on the offset portion 120, as by the same nut and bolt combinations 149, as best seen in FIG. 10.

It should therefore be apparent that a motion transfer system embodying the concept of the present invention is compact, obviates the drawbacks inherent to the commonly employed prior art systems and otherwise accomplishes the objects of the invention.

What is claimed is:

1. A system for transferring motion between locations remote with respect to each other by a push-pull control cable assembly, said system having a motion conversion unit comprising: a housing, shaft means rotatably mounted in said housing, a throw arm secured to said shaft means and movable within said housing, a core element included in said push-pull control cable assembly and extending within said housing, means to rigidify that portion of said core element extending within said housing, a crosshead secured to said rigidified portion of said core element and means to effect linear movement of said crosshead in response to rotational movement of said throw arm.

2. A system, as set forth in claim 1, in which said means to effect linear movement of said crosshead comprises: a first guideway presented from said housing, said rigidified portion of said core element extending within said housing in substantially parallel orientation with respect to said first guideway and said crosshead being slidable in said first guideway.

3. A system, as set forth in claim 1, in which a first guideway is presented from said housing and a second guideway is presented from said throw arm, said crosshead being simultaneously slidable in said first and second guideways to accommodate linear movement of said rigidified core element in response to rotational movement of said throw arm.

4. A system, as set forth in claim 1, in which the means to rigidify said core element comprises a metallic sleeve swaged onto that portion of said core element which extends within said housing.

5. A system, as set forth in claim 1, in which said housing has a peripheral wall, a first guideway presented from said housing and extending between opposed locations along said peripheral wall, an anchor stub extending outwardly of said peripheral wall from at least one end of said guideway, a push-pull cable casing included within said push-pull control cable assembly, means to secure said cable casing to said anchor stub, said core element being slidably received within said casing and piercing said peripheral wall to extend parallel with said first guideway, a second guideway presented from said throw arm, said crosshead being simultaneously slidable in said first and second guideways to effect an operable interconnection between the rotational movement of said shaft means and the linear movement of said core element.

6. A system, as set forth in claim 1, in which a bracket is provided for mounting one or more switches, means on said throw arm to actuate said switches and means selectively to locate said bracket with respect to the range through which said throw arm moves.

7. A system, as set forth in claim 6, in which the means selectively to locate said bracket comprises: a plurality of arcuately spaced bores in said housing, at least one arcuate slot in said mounting bracket and clamping means extending through said slots to be anchored in said bores.

8. A system, as set forth in claim 7, in which the plurality of bores in said housing comprise at least five bores spaced at approximately 22½° intervals and in which there are at least two slots in said mounting bracket, each said slot having an arcuate span of approximately 15° and being spaced approximately 30° apart.

9. A system, as set forth in claim 1, in which a mounting plate is provided for securing said motion conversion unit in selected dispositions with respect to the desired orientation of a push-pull control cable assembly operatively communicating therewith.

10. A system, as set forth in claim 9, in which a pair of tapped bores are provided in said housing in symmetrical relation, one on either side of said force transfer shaft, said mounting plate having a plurality of bores, the span between several pairs of said bores being equal to the span between said tapped bores to permit the mounting plate to be secured to said housing in various orientations.

11. A system, as set forth in claim 10, in which a central aperture is provided in said mounting plate to permit an operative connection to said force transfer shaft rotatably mounted in said housing, said plurality of bores in said mounting plate comprising at least five bores circumferentially spaced about said central aperture, the spacing of said first five bores providing four spans that are equal to the spans between said tapped bores.

* * * * *